(12) United States Patent
Venkata et al.

(10) Patent No.: US 12,137,386 B2
(45) Date of Patent: Nov. 5, 2024

(54) RADIO RESOURCE MANAGEMENT RELAXATION FOR USER EQUIPMENT BASED ON MOBILITY STATE

(71) Applicant: APPLE INC., Cupertino, CA (US)

(72) Inventors: Naveen Kumar R Palle Venkata, San Diego, CA (US); Dawei Zhang, Cupertino, CA (US); Fangli Xu, Beijing (CN); Haijing Hu, Cupertino, CA (US); Ralf Rossbach, Bavaria-Bayern (DE); Sarma V. Vangala, Cupertino, CA (US); Sethuraman Gurumoorthy, Cupertino, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 377 days.

(21) Appl. No.: 17/593,687

(22) PCT Filed: Jan. 13, 2021

(86) PCT No.: PCT/CN2021/071622
§ 371 (c)(1),
(2) Date: Sep. 22, 2021

(87) PCT Pub. No.: WO2022/151113
PCT Pub. Date: Jul. 21, 2022

(65) Prior Publication Data
US 2023/0180091 A1    Jun. 8, 2023

(51) Int. Cl.
*H04W 36/32*    (2009.01)
*H04W 36/00*    (2009.01)
(Continued)

(52) U.S. Cl.
CPC ....... *H04W 36/32* (2013.01); *H04W 36/0058* (2018.08); *H04W 36/08* (2013.01); *H04W 68/02* (2013.01); *H04W 76/20* (2018.02)

(58) Field of Classification Search
CPC . H04W 36/32; H04W 36/0058; H04W 36/08; H04W 76/20; H04W 68/02
(Continued)

(56) References Cited

U.S. PATENT DOCUMENTS 11,206,222 B2 * 12/2021 Pal ........................ H04L 5/1438
2014/0242960 A1    8/2014 Cai et al.
(Continued)

FOREIGN PATENT DOCUMENTS

| CN | 103621139 A | 3/2014 |
| CN | 104247503 A | 12/2014 |

(Continued)

OTHER PUBLICATIONS

PCT/CN2021/071622, International Search Report and Written Opinion, Sep. 28, 2021, 9 pages.

*Primary Examiner* — Peter G Solinsky
(74) *Attorney, Agent, or Firm* — Dorsey & Whitney LLP

(57) ABSTRACT

Provided is a method for a user equipment (UE). The method includes determining a mobility state of the UE and performing reference signal measurement in a relaxation mode within at least one cell. The mobility state indicates mobility capability of the UE, and, the at least one cell is determined based on the mobility state.

17 Claims, 9 Drawing Sheets

(51) Int. Cl.
*H04W 36/08* (2009.01)
*H04W 68/02* (2009.01)
*H04W 76/20* (2018.01)

(58) Field of Classification Search
USPC .......................................................... 370/331
See application file for complete search history.

(56) References Cited

U.S. PATENT DOCUMENTS

2020/0314868 A1* 10/2020 Tseng .................. H04B 17/318
2021/0352507 A1* 11/2021 He .................... H04W 52/0258
2023/0060019 A1* 2/2023 Hwang .................. H04W 4/40
2023/0078923 A1* 3/2023 Shi .................... H04W 52/0258
                                                                370/311
2023/0217276 A1* 7/2023 Chen .................... H04W 24/10
                                                                370/252

FOREIGN PATENT DOCUMENTS

| CN | 110383892 A | 10/2019 | |
|---|---|---|---|
| CN | 112020872 A | 12/2020 | |
| WO | 2013138225 A1 | 9/2013 | |
| WO | WO-2020089388 A1 * | 5/2020 | ............ H04B 7/0695 |
| WO | WO-2020144404 A1 * | 7/2020 | ............ H04W 24/10 |
| WO | WO-2020249199 A1 * | 12/2020 | ............ H04W 16/28 |
| WO | WO-2021064281 A1 * | 4/2021 | ............ H04L 5/0051 |
| WO | WO-2021083531 A1 * | 5/2021 | ........ H04W 52/0216 |
| WO | WO-2021118434 A1 * | 6/2021 | ............ H04W 48/12 |
| WO | WO-2022084942 A1 * | 4/2022 | ............ H04W 24/10 |
| WO | WO-2022087604 A1 * | 4/2022 | ............ H04W 24/08 |

* cited by examiner

RADIO RESOURCE MANAGEMENT RELAXATION FOR USER EQUIPMENT BASED ON MOBILITY STATE

TECHNICAL FIELD

This application relates generally to wireless communication systems, and more specifically to Radio Resource Management (RRM) relaxation tor UEs.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.10 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method tor a user equipment (UE) is provided that comprises determining a mobility state of the UE, wherein the mobility state indicates mobility capability of the UE; and performing reference signal measurement in a relaxation mode within at least one cell, wherein the at least one cell is determined based on the mobility state According to an aspect of the present disclosure, a method of a base station is provided that comprises determining a mobility slate of a UE, wherein the mobility state indicates mobility capability of the UE; and determining at least one cell available for the UE, for transmitting to the UE

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UT RAN Node B, an eNB, an RNC and/or a gNB, such devices may be replaced with any type of base station.

In wireless communication systems, there are some cases that devices used as UEs do not need very high data-rates and are delay tolerant, but need to be power efficient. For example, the devices may be reduced capability devices (RedCap devices). Exemplary RedCap devices may include wearables, industrial sensors or surveillance devices. For another example, the UEs may be any other type of common devices that can used in New Radio (NR). The common devices may need to go into a power-saving state in some cases.

One way to save power for the UE is to relax RRM neighbor cell requirements in idle/inactive. For example, the measurement for the neighbor cells may be reduced or the measurement for the neighbor cells may be stopped during a time period.

Figure 1:
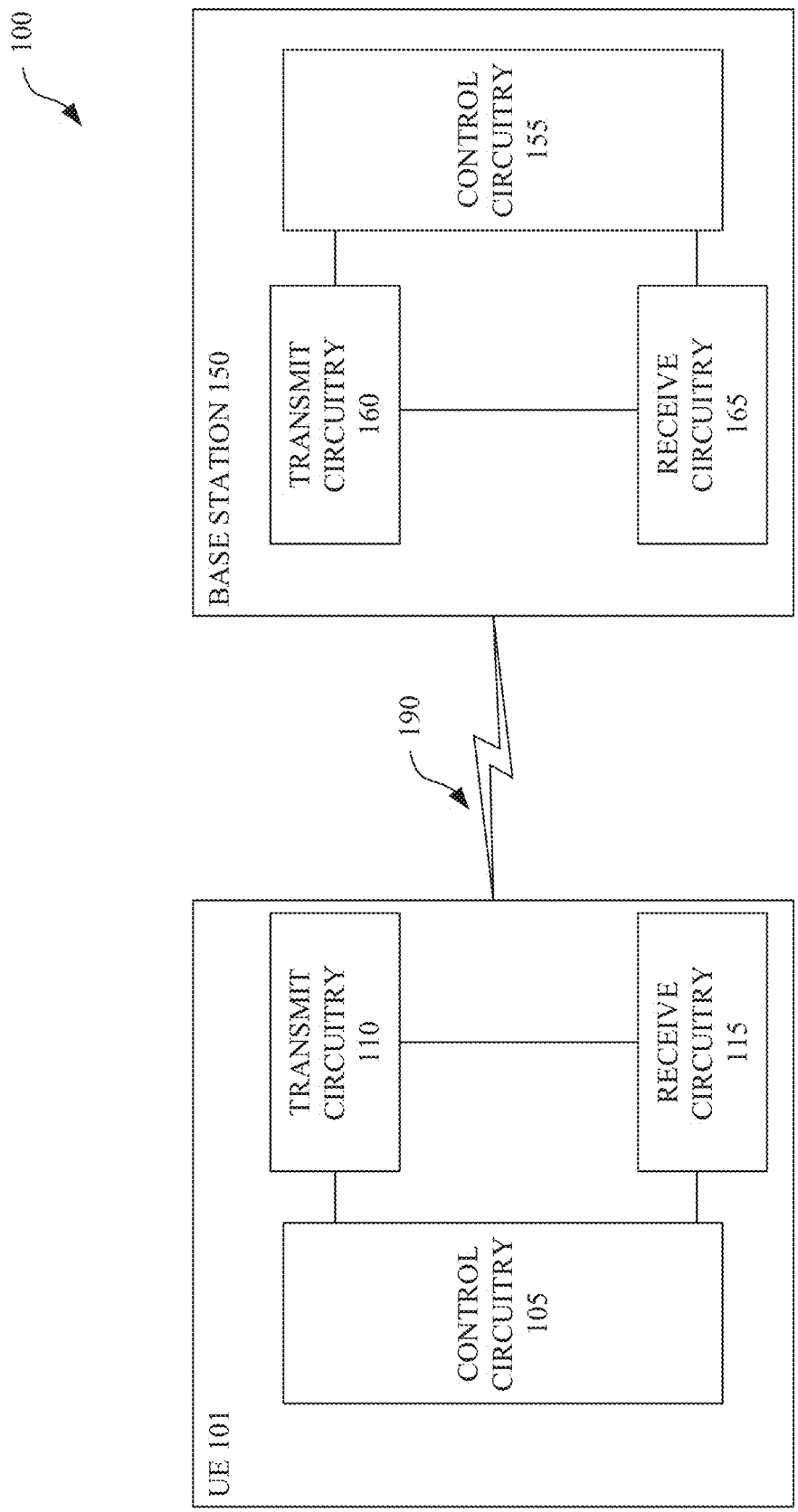
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machinery-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area presided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of live base station 150, for example, includes three sectors each covering a 120 degree area with an array of antennas directed to each sector to provide 260 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for parson to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink sub-frames.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple limes and the receive circuitry 115 may receive multiple copies of the same data multiple times.

Communications between the UE and the network (e.g. the UE transmitting or receiving a message or information to or from the network) herein may cover communications between the UE and the base station. Therefore, when transmission/reception performed by the network is mentioned herein, it includes the transmission/reception performed by the base station.

Figure 2:
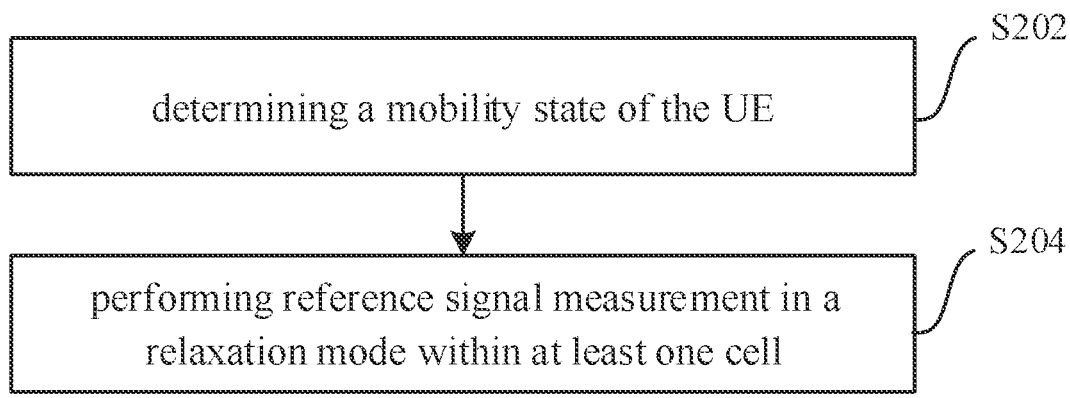
FIG. 2 illustrates a flowchart for an exemplary method for a user device in accordance with some embodiments.

FIG. 2 illustrates a flowchart for an exemplary method for a user device in accordance with some embodiments. The method 200 illustrated in FIG. 2 may be implemented by the UE 101 described in FIG. 1.

The method 200 may begin at step S202, where the UE may determine a mobility state of the UE. The mobility state may indicate mobility capability of the UE.

In some embodiments, the mobility state may indicate that the UE remains within a predetermined area.

In some implementations, the UE may permanently stay within the predetermined area. For example, the UE may be an industrial sensor and is in a fixed location. For another example, the UE may be a surveillance device and is stationary or has a restricted mobility capability.

In another implementations, the UE may temporarily stay within the predetermined area. For example, the UE may be a wearable such as a smart watch. When a user of the wearable goes home and sleeps at night, the UE temporarily stays at a location of the user's home.

In some embodiments, the mobility state of the UE may be determined by the UE according to predetermined settings of the UE. For example, for a stationary UE, the UE may be programmed to indicate the mobility state of the UE. For another example, for a wearable, the UE may determine that the UE will temporarily stay within the predetermined area when a GPS integrated in the UE detects that the wearable is located in the user's home.

In another embodiments, the UE may determine the mobility state based on network configurations. For example, the UE may determine that it stays within the predetermined area based on deviation of serving cell measurement from a reference value by an offset (e.g., s-SearchDeltaP-r16) for a period or based on network provided threshold values for RSRP (s-SearchThresholdP-r16) and RSRQ (s-SearchThresholdQ-r16) for a period.

In some embodiments, the UE may transmit the determined mobility state to the base station by NAS signaling of the device type. In another embodiments, the UE may transmit the determined mobility state to the base station by RRC signaling at access to the network. For example, the UE may transmit the determined mobility stale to the base station even time when it goes into a CONNECTED mode. The UE may determine its mobility state before initiating the connection.

At step S204, the UE may perform reference signal measurement in a relaxation mode within at least one cell. The at least one cell is determined based on the mobility state. In some examples, the at least one cell is determined by the base station.

In some implementations, the at least one cell may include a serving cell. For a stationary UE, the UE may remain on the same serving cell.

In another implementations, the at least one cell may include a serving cell and at least one neighbor cells (Ncells) of the serving cell. For example, the stationary UE may remain within a set of cells including a serving cell and at least one neighbor cells. For another example, for a UE which may move within a limited range, the UE may remain within a plurality of cells which cover the predetermined range of area.

The UE may be allowed a limited re-selection or disallowed re-selection in IDLE or INACTIVE. For example, the network may configure the UE to allow or not allow re-selection in IDLE or INACTIVE.

In one variant, step S204 may include limiting re-selection for other cells which are not included in the at least one cell for stationary UEs. The network may configure different thresholds for the UE to allow the UE to re-select.

In some embodiments, the UE is not allowed to perform re-selection. Therefore, the UE does not need to measure the reference signals of other cells, so that power of the UE can be saved.

In another embodiments, the UE is allowed only to perform re-selection within the set of the cells. For example, the UE is allowed to perform re-selection within the at least one NCell in response to at least one of: a determination that a reference signal (RS) measurement value of the serving cell is lower than a first cell measurement threshold, and a determination that a RS measurement value of the at least one NCell is higher than a second cell measurement threshold. The reference signal measurement may be reference signal receiving power (RSRP), reference signal receiving quality (RSRQ), etc. The first cell measurement threshold may be lower than a legacy threshold for cell reselection and the second cell measurement threshold may be higher than site legacy threshold for cell reselection. In this way, the criterions for re-selection of the UE are more difficult to be satisfied than legacy criterions, thus the power of the UE can be saved.

In another variant, step S204 may include limiting beam switching of broadcast beams between the UE and a serving cell for stationary UEs. The network may configure the UE to allow or not allow beam switching of broadcast beams in IDLE or INACTIVE mode. The broadcast beams may be SSB, or TCI-QCLed CSI-RS. Similar to the first cell measurement threshold for the serving cell and the second cell measurement threshold, the network may configure different beam measurement thresholds for different beams for control of the UE switching of beans. For stationary UEs, since a location of the UE is fixed, the optimal beam for the UE may also be fixed. Therefore, beam switching may be disallowed for the UE, and unnecessary measurements for other beams can be omitted.

In some implementations, the network max use the option of having the UE inform the network if there is a beam switching. This could be through RACH on the switched beam or through a MAC CE or an RRC message.

For the UE which may move within a limited range, the UE may be in a confined mobility state. The network may configure the UE in IDLE or INACTIVE with at least one NCells, and the UE is expected to re-select to cells only within the at least one NCells. The information of the at least one NCells may be transmitted to the UE via system broadcast, where the Ncells can be specifically addressed to the UE. Alternatively, the information of the Ncells may be transmitted to the UE while the UE is releasing the RRC connection to go into an IDLE mode or an INACTIVE mode.

In a variant, the UE may perform re-selection of cells within the at least one NCells with legacy thresholds.

In a variant, the network may configure cell measurement thresholds for the UE to allow the UE to re-select as described in connection with the stationary UE. For example, the UE is allowed to perform re-selection within the at least one NCells in response to at least one of: a determination that a reference signal (RS) measurement value of the serving cell is lower than a first cell measurement threshold, and a determination that a RS measurement value of the at least one NCell is higher than a second cell measurement threshold.

For the UE which may temporarily stay within the predetermined area, the UE may be expected to have similar mobility as other NR UEs, but there can be periods where the UE is not mobile (e.g., stationary). In this case, the UE goes into a semi-stationary state, when the UE temporarily stays within the predetermined area. The mobility state of the UE which may temporarily stay within the predetermined area may indicates the UE's ability to transition its mobility capability to temporarily stationary, and may be sent to the base station before the UE begins to temporarily stay within the predetermined area.

In a variant, the UE may autonomously go into the semi-stationary state, based on UE implementation. In some implementations, the UE may decide to go into the semi-stationary state based on GPS or gyroscope information. In another implementations, the UE may decide to go into the semi-stationary state based on network configuration (similar to events/thresholds like R16). In some cases, the thresholds may be RedCap specific thresholds or thresholds specific to power-saving modes of the devices. In this way, the network may control the UE's ability to transition into the semi-stationary state. In a further implementation, the network configuration may also include information of the at least one cells. For example the network configuration may include different thresholds for the UE to allow the UE to re-select. In this way, the network may have the ability to configure situation specific NCell or situation specific triggering configuration for the semi-stationary state.

the UE may not inform the network that it goes into the semi-stationary state and autonomously perform reference signal measurement in a relaxation mode within at least one cell as described before, for example, limiting re-selection for other cells which are not included in the at least one cell.

In some embodiments, the UE may transmit an indication that indicates that the UE moves out of the at least one cells. In this way, the UE may inform the network when the UE moves out of the network configured NCells. The network may not prevent the UE to re-select out of the network configured NCells, but may provide different thresholds that need to be satisfied before the UE re-select cells outside the network configured NCells. In this way, before receiving the indication that indicates that the UE moves out of the at least one cells, the network may assume that the UE does not move out of the predetermined area, and does not have to page the UE outside the predetermined area.

In some embodiments, the UE may receive a reference signal and a paging CORESET within the at least one cell from a base station. The reference signal is transmitted to the UE in advance of the paging CORESET by a time interval, wherein the time interval is smaller than a predetermined time threshold.

When the UE is in the CONNECTED mode, the UE may go into a "relaxed RRM mode", in which the UE may perform reference signal measurement in a relaxation mode within at least one cell. In some embodiments, the UE may generate an indication that informs the network that the UE transition into or out of the "relaxed RRM mode" in CONNECTED mode. For example, in order to provide the indication that informs the network that the UE transition into or out of the "relaxed RRM mode", the UE may use existing UEAssistanceInformation RRC message, a Measurement Report RRC message, a new RRC message created for informing the transition, or a new MAC CE. For another example, the UE may provide the indication that informs the network that the UE transition into or out of the "relaxed RRM mode" via UE general measurement reports without any explicit indication.

Since the UE is in the CONNECTED mode, the UE may provide contextual data to the network. For example, the UE may inform the network that the UE is in low-mobility state or not, which can result in NCell configuration by the network. In some embodiments, in CONNECTED mode, the UE may also generate, for transmission to a base station, information about whether a measurement gap is needed for interruption of transmission or reception on a serving cell to measure the NCells. The information about whether a measurement gap is needed may be included as part of communication between the UE and the network while in the CONNECTED mode Taking RedCap devices as an example, the RedCap device is either 1 Rx or 1 Rx UE and no carrier aggregation (CA) or double connection (DC), therefore a measurement gap is needed for inter-frequency NCell.

If the UE is in the IDLE mode or the INACTIVE mode, the re-selection of cells and/or beam switching of the UE may be limited based on the mobility state of the UE. If the UE is in a CONNECTED mode, the UE will not perform re-selection since active connections exists between the UE and the base station, and the base station may hand over the UE from a cell to another. Therefore, for UEs in the CONNECTED mode, step 204 may include performing handover within the at least one cells according to a command from a base station.

According to the embodiments of the present application, by performing reference signal measurement in a relaxation mode based on the mobility of the UE, unnecessary measurements for neighbor cells and unnecessary re-selection of cells can be omitted, therefore the power of the UE can be saved.

Figure 3:
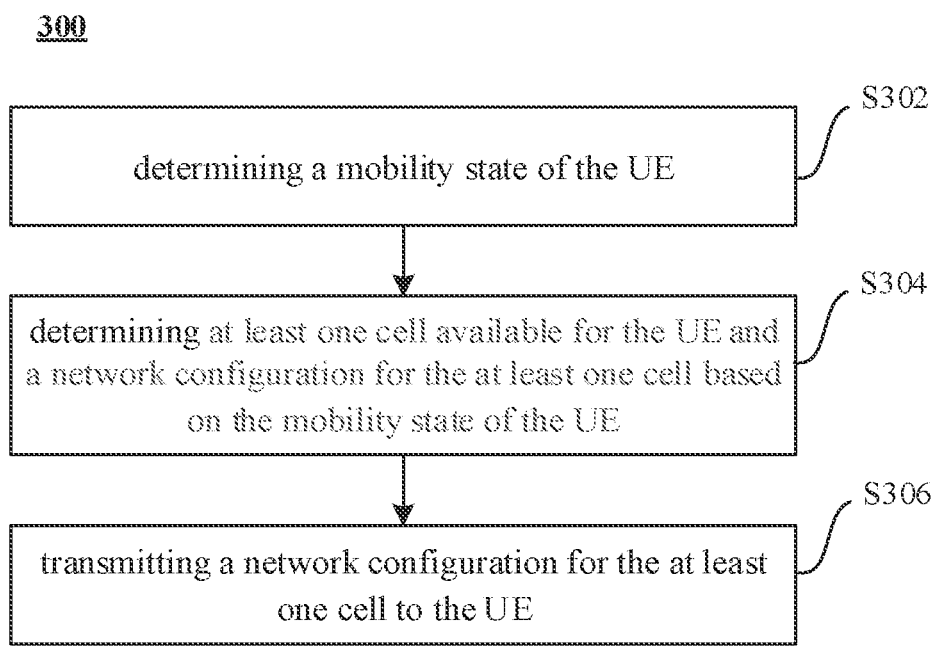
FIG. 3 illustrates a flowchart for an exemplary method for a base station in accordance with some embodiments.

FIG. 3 illustrates a flowchart for an exemplary method for a base station in accordance with some embodiments. The method 300 illustrated in FIG. 3 may be implemented by the base station 150 described in FIG. 1.

The method 300 may begin at step S302, where the base station may determine a mobility state of a UE. The mobility state may indicate mobility capability of the UE.

In some embodiments, the base station may receiving information indicating the mobility state of the UE via NAS signaling of a device type of the UE or via RRC signaling by the UE at access. In some embodiments, the UE may transmit the determined mobility state to the base station by NAS signaling of the device type. In another embodiment, the UE may transmit the determined mobility state to the base station by RRC signaling at access to the network. For example, the UE may transmit the determined mobility state to the base station every time when it goes into a CONNECTED mode. The UE may determine its mobility state before initiating the connection.

At step S304, the base station may determine at least one cell available for the UE and a network configuration for the at least one cell based on the mobility state of the UE, for transmitting to the UE. For example, the base station may determine a current serving cell for the UE and at least one Ncell of the current serving cell based on at least one of the location of the UE and general measurement report from the UE.

At step S306, the base station may transmit a network configuration for the at least one cell determined in step S304 to the UE. For example, after determining the at least one cell available for the UE, the base station may transmit the information of the determined at least one cell to the UE.

Furthermore, after the base station determines and knows the at least one cell available for the UE, the base station may page the UE within the determined at least one cell, and may not page the UE in any other cell.

For stationary UEs, the base station may configure the UE to allow or not allow re-selection in the IDLE mode or in the INACTIVE mode. For example, the base station may configure different thresholds for the UE to allow the UE to re-select within the determined at least one cell. For another example, the base station may also configure the UE to allow or not allow beam switching of broadcast beams in the IDLE mode or in the INACTIVE mode by configuring different beam measurement thresholds for different beams for control of the UE switching of beams.

After the base station determines and knows the at least one cell available for the UE, the base station may not page the UE in any other cell. The base station may use the option of having the UE inform the base station if there is a beam switching. This could be through RACH on the switched beam or through a MAC CE or an RRC message. Thus, the base station may know even beam-level information.

For the UE which may move within a limited range, the base station may configure the UE in IDLE or INACTIVE with a set of NCells. The base station may transmit the information of the set of NCells via system broadcast and the UE is expected to re-select to cells only within the determined set of NCells.

For the UE which may temporarily stay within the predetermined area, the base station may provide network configuration to the UE before the UE goes into the IDLE mode or the INACTIVE mode. When the UE goes into the semi-stationary state, the base station may not know.

In some embodiments, the base station may receive information indicating that the UE moves out of the network configured NCells. In this situation, the base station may not prevent the UE to re-select out of the determined at least one cell, but may provide different thresholds for the cells out of the determined at least one cell, that need to be satisfied for the UE to re-select out of the determined at least one cell.

In this way, before receiving the information indicating that the UE moves out of the network configured NCells, the base station may page the UE only in the predetermined area where the UE temporarily stays in.

For UEs in the CONNECTED mods, the base station may transmit a command to the UE to cause the UE to perform handover from current serving cell to an NCell within the determined at least one cell. For stationary UEs and UEs which may move within a limited range, the base station may limit the number of NCells for handover.

For UEs which may temporarily stay within the predetermined area, the UE may inform the base station about the transition into or out of the "relaxed RRM mode", and based on this information, the base station may configure thresholds that guide the UE to transition in and out of the "relaxed RRM mode". For example, the base station may re-configure the Ncells, or thresholds or even remove any NCells for handover.

In addition, the base station may also receive from the UE the information about whether a measurement gap is needed for interruption of transmission or reception on the serving cell, to measure the NCells.

For the stationary (or temporarily stationary) UEs and UEs with mobility within a limited range of area, it is important to discuss the measurement of Synchronization Signal and PBCH block (SSB)/CSI-RS (as part of serving cell measurements) in relation to reading paging PDCCH.

In some embodiments the SSB/CSI-RS (or TRS) may be very near the paging CORESET in time or frequency, that helps the UE with reception of paging. For example, the base station may generating a reference signal (such as the SSB/CSI-RS) and the paging CORESET for transmitting to the UE. The reference signal may be transmitted to the UE before the paging CORESET and within a predetermined time threshold. As another example, the base station may configure the reference signal via broadcast message or via UE dedicated signaling as part of the paging CORESET or search-space configuration.

The base station may configure a separate paging search-space and CORESET, as a bandwidth supported by the RedCap UEs could be different/smaller than a bandwidth supported by legacy NR devices. In such case, the CORESET/SEARCHSPACE can include additional reference signals, or QCL information related to SSB of the serving cell.

According to the embodiments of the present application, by determining and configuring the at least one cells available for the UE, the base station may configure the UE to perform measurement of NCells in a power-saving way. By paging the UE within the at least one cells, the base station can also operate in a more power-saving way.

Some exemplary examples of the procedures according to the above embodiments will be described.

For the stationary UE in the IDLE mode or the INACTIVE mode, an exemplary procedure may comprise the following processes:
 the UE determines the mobility state of the UE, and transmits the mobility state of the UE to the base station;
 the base station receives the mobility state from the UE, and determines at least one cell available for the UE and a network configuration for the at least one cell based on the mobility state of the UE, wherein the network configuration may include indications that the UE is allowed or not allowed to perform re-selection;
 the base station then transmits the network configuration to the UE;
 the base station transmits reference signals to the UE;
 the UE measures the reference signals transmitted from the base station and performs re-selection based on the measurement of the reference signals according to the received network configuration;
 the base station optionally transmits paging CORESET within the determined at least one cells; and
 the UE receives the paging CORESET.

For the stationary UE in the CONNECTED mode, an exemplary procedure may comprise the following processes:
 the UE transmits the mobility state of the UE to the base station;
 the base station receives the mobility state from the UE, and determines at least one cell available for the UE and a network configuration for the at least one cell based on the mobility state of the UE; and
 the base station transmits a command to the UE to cause the UE to perform handover within the determined at least one cell.

For the UE which may move within a limited range in the IDLE mode or the INACTIVE mode, an exemplary procedure may comprise the following processes:
 the UE determines the mobility state of the UE, and transmits the mobility state of the UE to the base station;
 the base station receives the mobility state from the UE, and determines at least one cell available for the UE and a network configuration for the at least one cell based on the mobility state of the UE, wherein the network configuration may include indications that the UE is allowed or not allowed to perform re-selection;
 the base station then transmits the network configuration to the UE;
 the UE measures reference signals transmitted from the base station and performs re-selection based on the measurement of the reference signals according to the received network configuration;
 the base station optionally transmits paging CORESET within the determined at least one cells; and
 the UE receives the paging CORESET.

For the UE which may move within a limited range in the CONNECTED mode, an exemplary procedure may comprise the following processes:
 the UE transmits the mobility state of the UE to the base station;
 the base station receives the mobility state from the UE, and determines at least one cell available for the UE and a network configuration for the at least one cell based on the mobility state of the UE; and
 the base station transmits a command to the UE to cause the UE to perform handover within the determined at least one cell.

For the UE which may temporarily stay within the predetermined area in the IDLE mode or the INACTIVE mode, an exemplary procedure may comprise the following processes:
 the UE transmits the mobility state of the UE indicating that the UE has the ability to transition its mobility capability to the semi-stationary state before it goes into the semi-stationary state;
 the base station determines at least one cell available for the UE in the semi-stationary state and a network configuration for the at least one cell, and transmits the network configuration to the UE before the UE goes into the semi-stationary state;
 when the UE goes into the semi-stationary state, the UE may not inform the base station, and will perform reference signal measurement in a relaxation mode within at least one cell according to the received network configuration;
 the UE measures reference signals transmitted from the base station and performs re-selection based on the measurement of the reference signals according to the received network configuration;
 the base station optionally transmits paging CORESET within the determined at least one cells; and
 the UE receives the paging CORESET.

For the UE which may temporarily stay within the predetermined area in the CONNECTED mode, an exemplary procedure may comprise the following processes:

the UE informs the base station about the mobility state including the transition of the mobility capability of the UE;

the base station receives the mobility state from the UE, and determines at least one cell available for the UE and a network configuration for the at least one cell based on the mobility state of the UE; and the base station transmits a command to the UE to cause the UE to perform handover within the determined at least one cell.

The processes of the exemplary procedures as described in the above can be implemented according to the embodiments set forth with reference to FIGS. 2 and 3.

Figure 4:
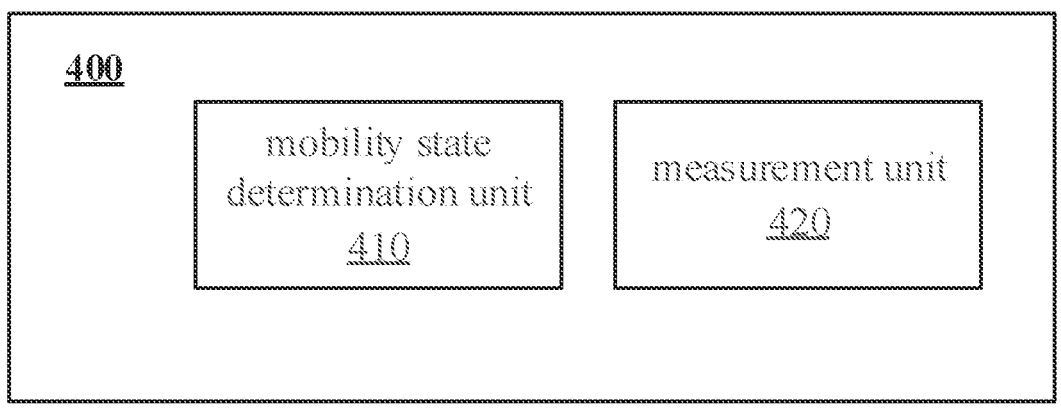
FIG. 4 illustrates an exemplary block diagram of an apparatus for a user equipment (UE) in accordance with some embodiments.

FIG. 4 illustrates an exemplary block diagram of an apparatus for a user equipment (UE) in accordance with some embodiments. The apparatus 400 illustrated in FIG. 4 may be used to implement the method 200 as illustrated in combination with FIG. 2.

As illustrated in FIG. 4, the apparatus 400 includes a mobility state determination unit 410 and a measurement unit 420.

The mobility state determination unit 410 may be configured to determine a mobility state of the UE, wherein the mobility state indicates mobility capability of the UE. The measurement unit 420 may be configured to perform reference signal measurement in a relaxation mode within at least one cell, wherein the at least one cell is determined based on the mobility slate.

According to the embodiments of the present application, by performing reference signal measurement in a relaxation mode based on the mobility of the UE, unnecessary measurements for neighbor cells and unnecessary re-selection or cells can be omitted, therefore the power of the UE can be saved.

Figure 5:
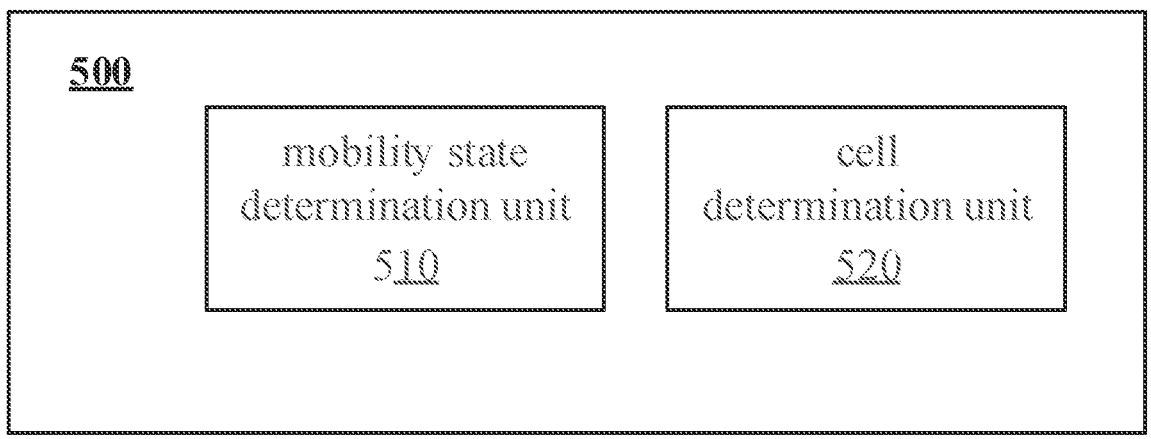
FIG. 5 illustrates an exemplary block diagram of an apparatus for a base station in accordance with some embodiments.

FIG. 5 illustrates an exemplary block diagram of an apparatus for a base station in accordance with some embodiments. The apparatus 500 illustrated in FIG. 5 may be used to implement the method 300 as illustrated in combination with FIG. 3.

As illustrated in FIG. 5, the apparatus 500 includes a mobility stale determination unit 510 and a cell determination unit 520.

The mobility state determination unit 510 may be configured to determine a mobility state of a UE, wherein the mobility state indicates mobility capability of the UE; and the cell determination unit 520 may be configured to determining at least one cell available for the UE, for transmitting to the UE.

According to the embodiments of the present application, by determining and configuring the at least one cells available for the UE, the base station may configure the UE to perform measurement of NCells in a power-saving way. By paging the UE within the at least one cells, the base station can also operate in a more power-saving way.

Figure 6:
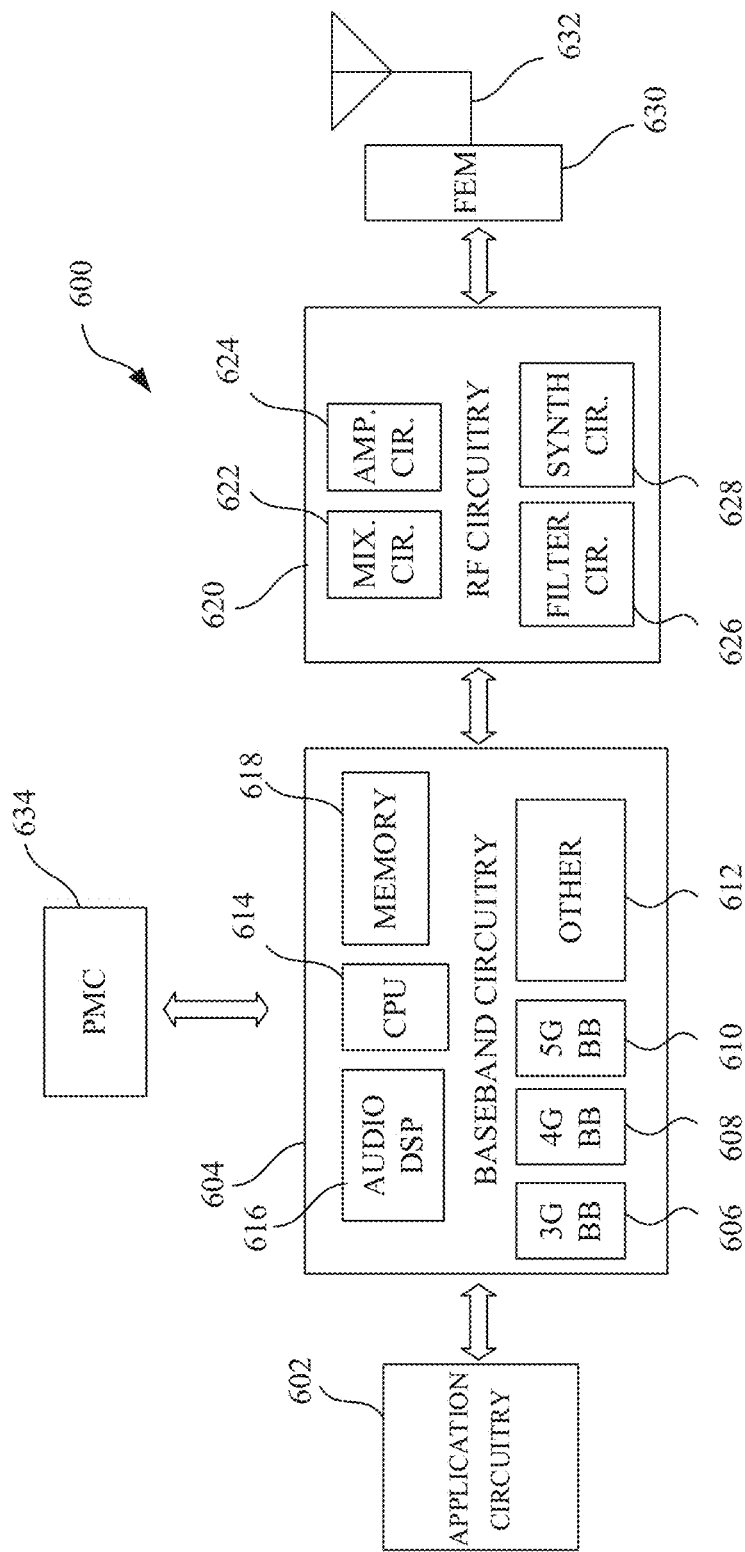
FIG. 6 illustrates example components of a device 600 in accordance with some embodiments.

FIG. 6 illustrates example components of a device 600 in accordance with some embodiments. In some embodiments, the device 600 may include application circuitry 602, baseband circuitry 604, Radio Frequency (RF) circuitry (shown as RF circuitry 620), front-end module (FEM) circuitry (shown as FEM circuitry 630), one or more antennas 632, and power management circuitry (PMC) (shown as PMC 634) coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 620 and to generate baseband signals for a transmit signal path of the RF circuitry 620. The baseband circuitry 604 may interface with the application circuitry 602 for generation and processing of the baseband signals and for controlling operations of the RF circuitry 620. For example, in some embodiments, the baseband circuitry 604 may include a third generation (3G) baseband processor (3G baseband processor 606), a fourth generation (4G) baseband processor (4G baseband processor 608), a fifth generation (5G) baseband processor (5G baseband processor 610), or other baseband processor(s) 612 for other existing generations, generations in development or to be developed in the future (e.g., second generation (2G), sixth generation (6G), etc.). The baseband circuitry 604 (e.g., one or more of baseband processors) may handle various radio control functions that enable communication with one or more radio networks via the RF circuitry 620. In other embodiments, some or all of the functionality of the illustrated baseband processors may be included in modules stored in the memory 618 and executed via a Central Processing ETnit (CPET 614). The radio control functions may include, but are not limited to, signal modulation/demodulation, encoding/decoding, radio frequency shifting, etc. In some embodiments, modulation/demodulation circuitry of the baseband circuitry 664 may include Fast-Fourier Transform (FFT), precoding or constellation mapping/demapping functionality. In some embodiments, encoding-decoding circuitry of the baseband circuitry 664 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include a digital signal processor (DSP), such as one or more audio DSP(s) 616. The one or more audio DSP(s) 616 may be include elements for compression/decompression and echo cancellation and may include other suitable processing elements in other embodiments. Components of the base band circuitry may be suitably combined in a single chip, a single chipset, or disposed on a same circuit board in some embodiments. In some embodiments, some or all of the constituent components of the baseband circuitry 604 and the application circuity 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

The RF circuitry 620 may enable communication with wireless networks using modulated electromagnetic radiation through a non-solid medium. In various embodiments, the RF circuitry 626 may include switches, filters, amplifiers, etc. to facilitate the communication with the wireless network. The RF circuitry 620 may include a receive signal path which may include circuitry to down-convert RF signals received from the FEM circuitry 630 and provide baseband signals to the baseband circuitry 604. The RF circuitry 620 may also include a transmit signal path which may include circuitry to up-convert baseband signals provided by the baseband circuitry 604 and provide RF output signals to the FEM circuitry 630 for transmission.

In some embodiments, the receive signal path of the RF circuitry 620 may include mixer circuitry 622, amplifier circuitry 624 and filter circuitry 626. In some embodiments, the transmit signal path of the RF circuitry 620 may include filter circuitry 626 and mixer circuitry 622. The RF circuitry 620 may also include synthesizer circuitry 628 for synthesizing a frequency for use by the mixer circuitry 622 of the receive signal path and the transmit signal path. In some embodiments, the mixer circuitry 622 of the receive signal path may be configured to down-convert RF signals received from the FEM circuitry 630 based on the synthesized frequency provided by synthesizer circuitry 628. The amplifier circuitry 624 may be configured to amplify the down-converted signals and the filter circuitry 626 may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, the mixer circuitry 622 of the receive signal path may comprise passive mixers, although the scope of the embodiments is not limited in this respect.

In some embodiments, the mixer circuitry 622 of the transmit signal path may be configured to up-convert input baseband signals based on the synthesized frequency provided by the synthesizer circuitry 628 to generate RF output signals for the FEM circuitry 630. The baseband signals may be provided by the baseband circuitry 604 and may be filtered by the fiber circuitry 626.

In some embodiments, the mixer circuitry 622 of the receive signal path and the mixer circuitry 622 of the transmit signal path may include two or more mixers and may be arranged for quadrature downconversion and upconversion, respectively. In some embodiments, the mixer circuitry 622 of the receive signal path and the mixer circuitry 622 of the transmit signal path may include two or more mixers and may be arranged for image rejection (e.g., Hartley image rejection). In some embodiments, the mixer circuitry 622 of the receive signal path and the mixer circuitry 622 may be arranged for direct downconversion and direct upconversion, respectively. In some embodiments, the mixer circuitry 622 of the receive signal path and the mixer circuitry 622 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 620 may include analog-to-digital converter (ADC) and digital-to-analog converter (DAC) circuitry and the baseband circuitry 604 may include a digital baseband interface to communicate with the RF circuitry 620.

In some dual-mode embodiments, a separate radio IC circuitry may be provided for processing signals for each spectrum, although the scope of the embodiments is not limited in this respect.

In some embodiments, the synthesizer circuitry 628 may be a fractional-N synthesizer or a fractional N/N+1 synthesizer, although the scope of the embodiments is not limited in this respect as other types of frequency synthesizers may be suitable. For example, synthesizer circuitry 628 may be a delta-sigma synthesizer, a frequency multiplier, or a synthesizer comprising a phase-locked loop with a frequency divider.

The synthesizer circuitry 628 may be configured to synthesize an output frequency for use by the mixer circuitry 622 of the RF circuitry 620 based on a frequency input and a divider control input. In some embodiments, the synthesizer circuitry 628 may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 (such as an applications processor) depending on the desired output frequency. In some embodiments, a divider control input (e.g., N) may be determined from a look-up table based on a channel indicated by the application circuitry 602.

Synthesizer circuitry 628 of the RF circuitry 620 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 628 may be configured to generate a carrier frequency as the output frequency, while in other embodiments, the output frequency may be a multiple of the earner frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 620 may include an IQ/polar converter.

The FEM circuitry 630 may include a receive signal path which may include circuitry configured to operate on RF signals received from one or more antennas 632, amplify the received signals and provide the amplified versions of the received signals to the RF circuitry 620 for further processing. The FEM circuitry 630 may also include a transmit signal path which may include circuitry configured to amplify signals for transmission provided by the RF circuitry 620 for transmission by one or more of the one or more antennas 632. In various embodiments, the amplification through the transmit or receive signal paths may be done solely in the RF circuitry 620, solely in the FEM circuitry 630, or in both the RF circuitry 620 and the FEM circuitry 630.

In some embodiments, the FEM circuitry 630 may include a TX/RX switch to switch between transmit mode and receive mode operation. The FEM circuitry 630 may include a receive signal path and a transmit signal path. The receive signal path of the FEM circuitry 630 may include an LNA to amplify received RF signals and provide the amplified received RF signals as an output (e.g., to the RF circuitry 620). The transmit signal path of the FEM circuitry 630 may include a power amplifier (PA) to amplify input RF signals (e.g., provided by the RF circuitry 620), and one or more filters to generate RF signals for subsequent transmission (e.g., by one or more of the one or more antennas 632).

In some embodiments, the PMC 634 may manage power provided to the baseband circuitry 604. In particular, the PMC 634 may control power-source selection, voltage scaling, battery charging, or DC-to-DC conversion. The PMC 634 may often be included when the device 600 is capable of being powered by a battery, for example, when the device 600 is included in a EGE. The PMC 634 may increase the power conversion efficiency while providing desirable implementation size and heat dissipation characteristics.

FIG. 6 shows the PMC 634 coupled only with the baseband circuitry 604. However, in other embodiments, the PMC 634 may be additionally or alternatively coupled with, and perform similar power management operations for, other components such as, but not limited to, the application circuitry 602, the RF circuitry 620, or the FEM circuitry 630.

In some embodiments, the PMC 634 may centered, or otherwise be part of various power saving mechanisms of the device 600. For example, if the device 600 is in an RRC Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC Idle state, where it disconnects from the network and does not perform operations such as channel quality feedback, handover, etc. The device 600 goes into a very low power state and it performs paging where again is periodically wakes up to listen to the network and then powers down again. The device 600 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a huge delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node described in further detail below.

Figure 7:
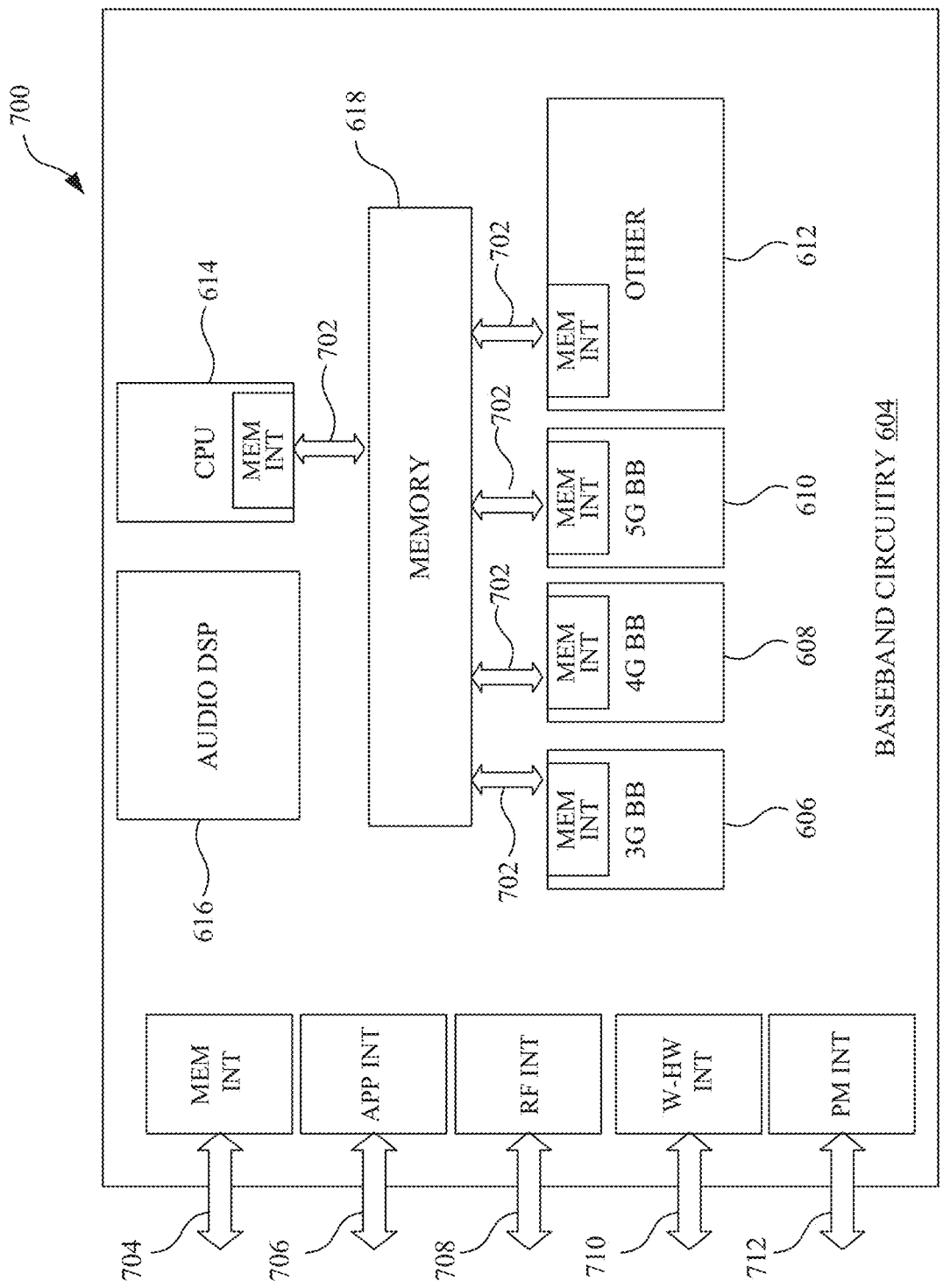
FIG. 7 illustrates example interfaces 700 of baseband circuitry in accordance with some embodiments.

FIG. 7 illustrates example interfaces 700 of baseband circuitry in accordance with some embodiments. As discussed above, the baseband circuitry 604 of FIG. 6 may compose 3G baseband processor 606, 4G baseband processor 608, 5G baseband processor 610, other baseband processor(s) 612, CPU 614, and a memory 618 utilized by said processors. As illustrated, each of the processors may include a respective memory interface 1402 to send/receive data to/from the memory 618.

The baseband circuitry 604 may further include one or more interfaces to communicatively couple to other circuitries/devices, such as a memory interface 704 (e.g., an interface to send/receive data to/from memory external to the baseband circuitry 604), an application circuitry interface 706 (e.g., an interface to send/receive data to/from the application circuitry 602 of FIG. 6), an RF circuitry interface 708 (e.g., an interface to send/receive data to/from RF circuitry 620 of FIG. 6), a wireless hardware connectivity interface 710 (e.g., an interface to send/receive data to/from Near Field Communication (NFC) components, Bluetooth® components (e.g., Bluetooth® Low Energy), Wi-Fi® components, and other communication components), and a power management interface 712 (e.g., an interface to send/receive power or control signals to/from the PMC 634.

Figure 8:
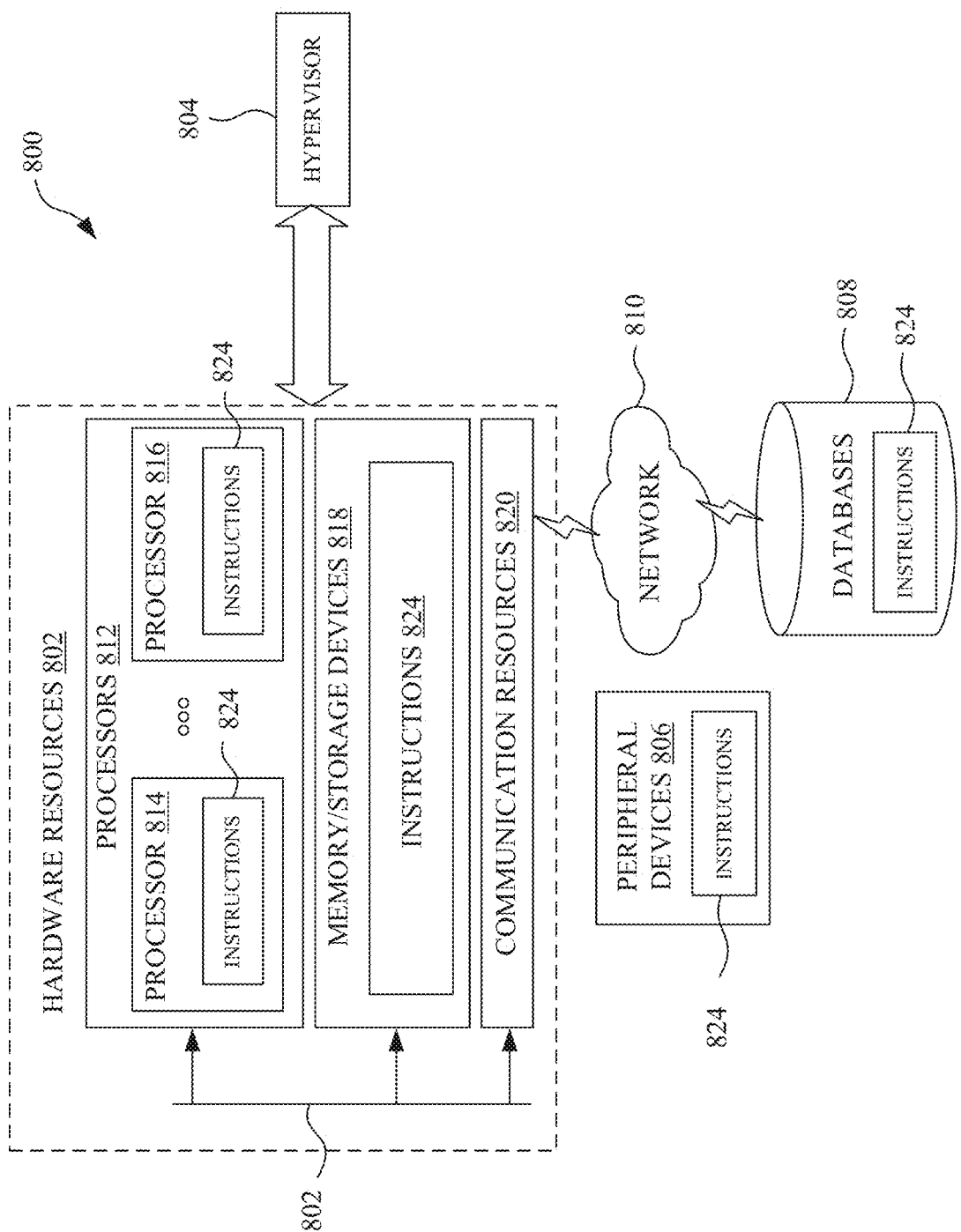
FIG. 8 illustrates components in accordance with some embodiments.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 812 (or processor cores), one or more memory/storage devices 818, and one or mote communication resources 820, each of which may be communicatively coupled via a bus 822. For embodiments where node virtualization (e.g., NFV) is utilized, a hypervisor 804 may be executed to provide an execution environment for one or more network slices/sub-slices to utilize the hardware resources 802.

The processors 812 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 814 and a processor 816.

The memory/storage devices 818 may include main memory, disk storage, or any suitable combination thereof. The memory/storage devices 818 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-static storage, etc.

The communication resources 820 may include interconnection or network interface components or other suitable devices to communicate with one or more peripheral devices 806 or one or mote databases 808 via a network 810. For example, the communication resources 820 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 824 may comprise software, a program, an application, an applet, an app, or other executable code for causing at least any of the processors 812 to perform any one or more of the methodologies discussed herein. The instructions 824 may reside, completely or partially, within at least one of the processors 812 (e.g., within the processor's cache memory), the memory/storage devices 818, or any suitable combination thereof. Furthermore, any portion of the instructions 824 may be transferred to the hardware resources 802 from any combination of the peripheral devices 806 or the databases 808. Accordingly, the memory of the processors 812, the memory/storage devices 818, the peripheral devices 806, and the databases 808 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 9:
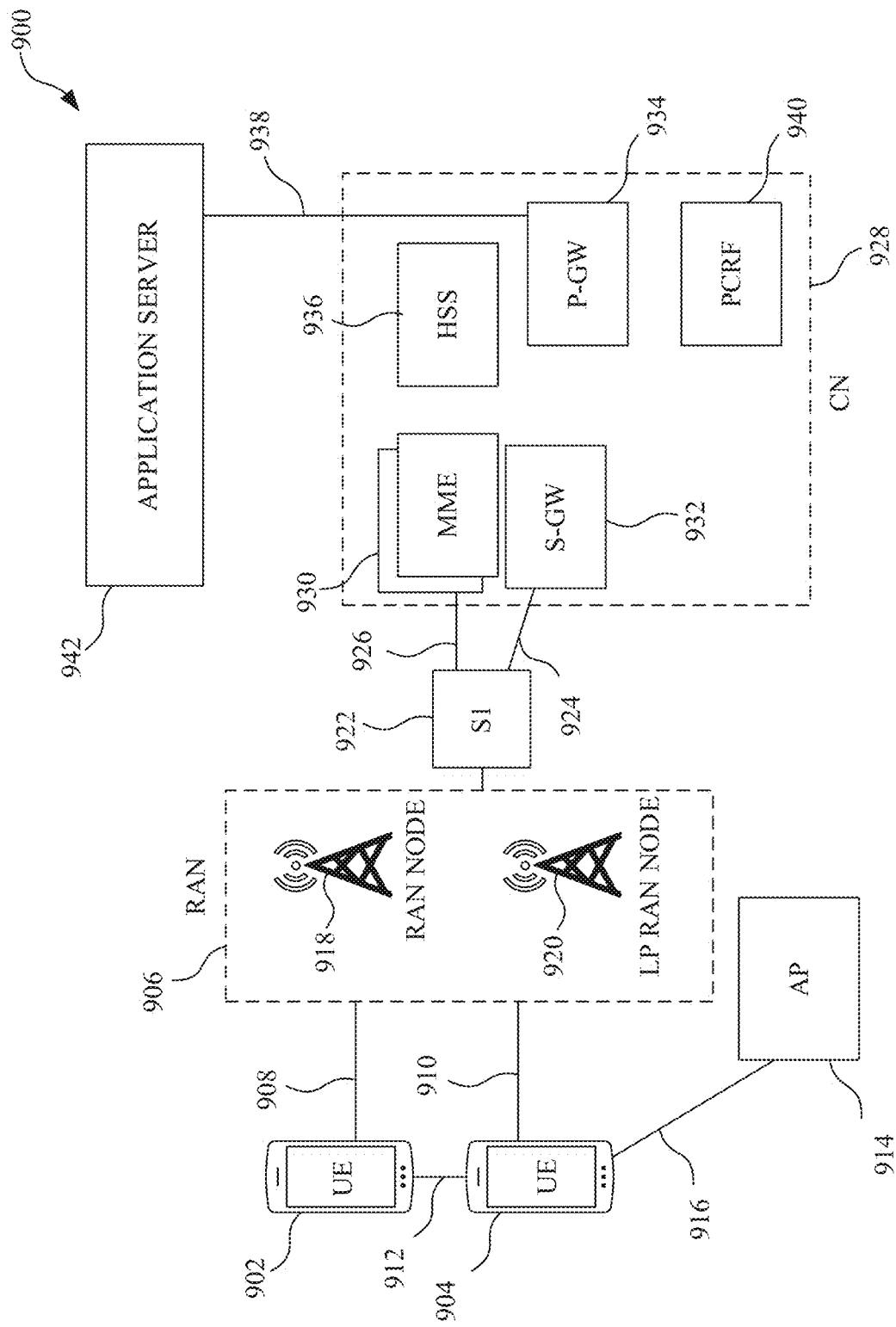
FIG. 9 illustrates an architecture of a wireless network in accordance with some embodiments.

FIG. 9 illustrates an architecture of a system 900 of a network in accordance with some embodiments. The system 900 includes one or more user equipment (UE), shown in this example as a UE 902 and a UE 904. The UE 902 and the UE 904 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 902 and the UE 904 can comprise an Internet of Things (IoT) UE, which can comprise a network access fever designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 902 and the UE 904 may be configured to connect, e.g., communicatively couple, with a radio access network (RAN), shown as RAN 906. The RAN 906 may be, for example, an Evolved ETntversal Mobile Telecommunications System (ETMTS) Terrestrial Radio Access Network (E-UTRAN), a NextGen RAN (NG RAN), or some other type of RAN. The UE 902 and the UE 904 utilize connection 908 and connection 910, respectively, each of which comprises a physical communications interface or layer (discussed in further detail below); in this example, the connection 908 and the connection 910 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 902 and the UE 904 may further directly exchange communication data via a ProSe interface 912. The ProSe interface 912 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 904 is shown to be configured to access an access point (AP), shown as AP 914, via connection 916. The connection 916 can comprise a local wireless connection, such as a connection consistent with any IEEE 802.11 protocol, wherein the AP 914 would comprise a wireless fidelity (WiFi®) router. In this example, the AP 914 may be connected to the Internet without connecting to the core network of the wireless system (described in further detail below).

The RAN 906 can include one or more access nodes that enable the connection 908 and the connection 910. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 906 may include one or more RAN nodes for providing macrocells, e.g., macro RAN node 918, and one or more RAN nodes for providing femtocells or picocells (e.g., cells having smaller coverage areas, smaller user capacity, or higher bandwidth compared to macrocells), e.g., a low power (LP) RAN node such as LP RAN node 920.

Any of the macro RAN node 918 and the LP RAN node 920 can terminate the air interface protocol and can be the first point of contact for the UE 902 and the UE 904. In some embodiments, any of the macro RAN node 918 and the LP RAN node 920 can fulfill various logical functions for the RAN 906 including, but not limited to, radio network controller (RNC) functions such as radio bearer management, uplink and downlink dynamic radio resource management and data packet scheduling, and mobility management.

In accordance with some embodiments, the EGE 902 and the EGE 904 can be configured to communicate using Orthogonal Frequency-Division Multiplexing (OFDM) communication signals with each other or with any of the macro RAN node 918 and the LP RAN node 920 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 918 and the LP RAN node 920 to the UE 902 and the UE 904, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 902 and the UE 904. The physical downlink control channel (PDCCH) may carry information about the transport formal and resource allocations related to the PDSCH channel, among other things. It may also inform the UE 902 and the UE 904 about the transport format, resource allocation, and H-ARQ (Hybrid Automatic Repeat Request) information related to the uplink shared channel. Typically, downlink scheduling (assigning control and shared channel resource blocks to the UE 904 within a cell) may be performed at any of the macro RAN node 918 and the LP RAN node 920 based on channel quality information fed back from any of the UE 902 and UE 904. The downlink resource assignment information may be sent on the PDCCH used for (e.g., assigned to) each of the UE 902 and the UE 904.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 906 is communicatively coupled to a core network (CN), shown as CN 928—via an S1 interface 922. In embodiments, the CN 928 may be an evolved packet core (EPC) network, a NextGen Packet Core (NPC) network, or some other type of CN. In this embodiment the S1 interface 922 is split into two parts: the S1-U interface 1124, which carries traffic data between the macro RAN node 918 and the LP RAN node 920 and a serving gateway (S-GW), shown as S-GW 1 132, and an S1-mobility management entity (MME) interface, shown as S1-MME interface 926, which is a signaling interface between the macro RAN node 918 and LP RAN node 920 and the MME(s) 930.

In this embodiment, the CN 928 comprises the MME(s) 930, the S-GW 932, a Packet Data Network (PDN) Gateway (P-GW) (shown as P-GW 934), and a home subscriber server (HSS) (shown as HSS 936). The MME(s) 930 may be similar in function to the control plane of legacy Serving General Packet Radio Service (GPRS) Support Nodes (SGSN). The MME(s) 930 may manage mobility aspects in access such as gateway selection and tracking area list management. The HSS 936 may comprise a database for network users, including subscription-related information to support the network entities' handling of communication sessions. The CN 928 may comprise one or several HSS 936, depending on the number of mobile subscribers, on the capacity of the equipment, on the organization of the network, etc. For example, the HSS 936 can provide support for routing/roaming, authentication, authorization, naming/addressing resolution, location dependencies, etc.

The S-GW 932 may terminate the S1 interface 322 towards the RAN 906, and routes data packets between the RAN 906 and the CN 928. In addition, the S-GW 932 may be a local mobility anchor point for inter-RAN node handovers and also may provide an anchor for inter-3 GPP mobility. Other responsibilities may include lawful intercept, charging, and some policy enforcement.

The P-GW 934 may terminate an SGi interface toward a PDN. The P-GW 934 may route data packets between the CN 928 (e.g., an EPC network) and external networks such as a network including the application server 942 (alternatively referred to as application function (AF)) via an Internet Protocol (IP) interface (shown as IP communications interface 938). Generally, an application server 942 may be an element offering applications that use IP bearer resources with the core network (e.g., ETMTS Packet Services (PS) domain, LTE PS data services, etc.). In this embodiment, the P-GW 934 is shown to be communicatively coupled to an application server 1 142 via an IP communications interface 938. The application server 942 can also be configured to support one or more communication services (e.g., Voice-over-Internet Protocol (VoIP) sessions, PTT sessions, group communication sessions, social networking services, etc.) for the UE 902 and the UE 904 via the CN 928.

The P-GW 934 may further be a node for policy enforcement and charging data collection. A Policy and Charging Enforcement Function (PCRF) (shown as PCRF 940) is the policy and charging control element of the CN 928. In a non-roaming scenario, there may be a single PCRF in the Home Public Land Mobile Network (HPLMN) associated with a ETE's internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 940 may be communicatively coupled to the application server 942 via the P-GW 934. The application server 942 may signal the PCRF 940 to indicate a new service flow and select the appropriate Quality of Service (QoS) and charging parameters. The PCRP 940 may provision this rule into a Policy and Charging Enforcement Function (PCEF) (not shown) with the appropriate traffic flow template (TFT) and QoS class of identifier (QCI), which commences the QoS and charging as specified by the application server 942.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising:
  determining a mobility state of the UE, wherein the mobility state indicates mobility capability of the UE; and
  performing reference signal (RS) measurement in a relaxation mode within at least one cell, wherein the at least one cell is determined based on the mobility state.

Example 2 is the method of Example 1, wherein the UE is in an IDLE mode or an INACTIVE mode.

Example 3 is the method of Example 2, wherein the mobility state indicates that the UE remains within a predetermined area, and the method further comprises:
  limiting re-selection for other cells which are not included in the at least one cell based on a network configuration received from a base station.

Example 4 is the method of Example 3, wherein the UE is stationary, and the method further comprises:
  limiting beam switching of broadcast beams between the UE and a serving cell.

Example 5 is the method of Example 2, wherein the at least one cell comprises a serving cell and at least one neighbor cell (NCell), and the method further comprises:
  performing re-selection within the at least one NCell in response to at least one of:
    a determination that a reference signal measurement value of the serving cell is lower than a first cell measurement threshold, and
    a determination that a RS measurement value of the at least one NCell is higher than a second cell measurement threshold.

Example 6 is the method of Example 5, wherein the first cell measurement threshold is lower than a legacy threshold for cell reselection and the second cell measurement threshold is higher than the legacy threshold for cell reselection.

Example 7 is the method of Example 1, further comprises:
  transmitting the mobility state of the UE via NAS signaling of a device type of the UE or via RRC signaling at access to a base station.

Example 8 is the method of Example 1, further comprising:
  transmitting an indication that indicates that the UE moves out of the at least one cells.

Example 9 is the method of Example 1, wherein the UE is in a CONNECTED MODE.

Example 10 is the method of Example 9, further comprising generating, for transmission to a base station, information about whether a measurement gap is needed for interruption of transmission or reception on a serving cell, to measure neighbor cells.

Example 11 is the method of Example 1, wherein the method further comprises
  performing handover within the at least one cells according to a command from a base station.

Example 12 is the method of Example 1, further comprising:
  receiving a reference signal and a paging CORESET within the at least one cell from a base station, wherein the reference signal is transmitted to the UE in advance of the paging CORESET by a time interval, wherein the time interval is smaller than a predetermined time threshold.

Example 13 is a method of a base station, comprising:
  determining a mobility slate of a UE, wherein the mobility state indicates mobility capability of the UE; and
  determining at least one cell available for the UE and a network configuration for the at least one cell based on the mobility state of the UE; and
  transmitting the network configuration to the UE.

Example 14 is the method of Example 13, wherein the determining a mobility state of a UE comprises:
  receiving information indicating the mobility state of the UE via NAS signaling of a device type of the UE or via RRC signaling by the UE at access.

Example 15 is the method of Example 13, further comprising:
  paging the UE within the determined at least one cell, wherein the UE is in an IDLE mode or an INACTIVE mode.

Example 16 is the method of Example 15, further comprising:
  generating a reference signal and a paging CORESET for transmitting to the UE, wherein the reference signal is transmitted to the UE before the paging CORESET and within a predetermined time threshold.

Example 17 is the method of Example 13, further comprising:
transmitting a command to the UE, wherein the UE is in a CONNECTED mode and the command causes the UE to perform handover within the determined at least one cell.

Example 18 is an apparatus for a user equipment (UE), the apparatus comprising:
one or more processors configured to perform steps of the method according to any of Examples 1-17.

Example 19 is an apparatus for a base station, the apparatus comprising: one or more processors configured to perform steps of the method according to any of Examples 1-17.

Example 20 is a computer readable medium having computer programs stored thereon which, when executed by one or more processors, cause an apparatus to perform steps of the method according to any of Examples 1-17.

Example 21 is an apparatus for a communication device, comprising means for performing steps of the method according to any of Examples 1-17.

Example 33 is a computer program product comprising computer programs which, when executed by one or more processors, cause an apparatus to perform steps of the method according to any of Examples 1-17.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), comprising:
determining a mobility state of the UE, wherein the mobility state indicates mobility capability of the UE;
based on the mobility state, transitioning to a relaxation mode for radio resource management (RRM) measurement;
sending, from the UE to a base station, a UE assistance information message indicating that the UE is in the relaxation mode and indicating measurement gap information; and
performing reference signal (RS) measurement in the relaxation mode within at least one cell, wherein the at least one cell is determined based on the mobility state.

2. The method of claim 1, wherein the UE is in an IDLE mode or an INACTIVE mode.

3. The method of claim 2, wherein the mobility state indicates that the UE remains within a predetermined area, and the method further comprises:
limiting re-selection for other cells which are not included in the at least one cell based on a network configuration received from the base station.

4. The method of claim 3, wherein the UE is stationary, and the method further comprises:
limiting beam switching of broadcast beams between the UE and a serving cell.

5. The method of claim 2, wherein the at least one cell comprises a serving cell and at least one neighbor cell (NCell), and the method further comprises:
performing re-selection within the at least one NCell in response to at least one of:
a determination that a reference signal measurement value of the serving cell is lower than a first cell measurement threshold, and
a determination that a RS measurement value of the at least one NCell is higher than a second cell measurement threshold.

6. The method of claim 5, wherein the first cell measurement threshold is lower than a legacy threshold for cell reselection and the second cell measurement threshold is higher than the legacy threshold for cell reselection.

7. The method of claim 1, further comprising:
transmitting the mobility state of the UE via NAS signaling of a device type of the UE or via RRC signaling at access to the base station.

8. The method of claim 1, further comprising:
transmitting an indication that indicates that the UE moves out of the at least one cells.

9. The method of claim 1, wherein the UE is in a CONNECTED MODE.

10. The method of claim 9, further comprising generating, for transmission to a base station, information about whether a measurement gap is needed for interruption of transmission or reception on a serving cell to measure neighbor cells.

11. The method of claim 1, wherein the method further comprises:
performing handover within the at least one cell according to a command from a base station.

12. The method of claim 1, further comprising:
receiving a reference signal and a paging CORESET within the at least one cell from a base station, wherein the reference signal is transmitted to the UE in advance of the paging CORESET by a time interval, wherein the time interval is smaller than a predetermined time threshold.

13. A method of a base station, comprising:
determining a mobility state of a user equipment (UE), wherein the mobility state indicates mobility capability of the UE;
receiving, from the UE, a UE assistance information message indicating that the UE is in a relaxation mode, and indicating measurement gap information;
determining, based in part on the received UE assistance information message, at least one cell available for the UE and a network configuration for the at least one cell based on the mobility state of the UE; and
transmitting the network configuration to the UE.

14. The method of claim 13, wherein the determining the mobility state of the UE comprises:
receiving information indicating the mobility state of the UE via NAS signaling of a device type of the UE or via RRC signaling by the UE at access.

15. The method of claim 13, further comprising:
paging the UE within the determined at least one cell, wherein the UE is in an IDLE mode or an INACTIVE mode.

16. The method of claim 15, further comprising:
generating a reference signal and a paging CORESET for transmission to the UE, wherein the reference signal is transmitted to the UE in advance of the paging CORESET by a time interval, wherein the time interval is smaller than a predetermined time threshold.

17. The method of claim 13, further comprising:
transmitting a command to the UE, wherein the UE is in a CONNECTED mode and the command causes the UE to perform handover within the determined at least one cell.

* * * * *